(12) United States Patent
Biermann et al.

(10) Patent No.: US 9,638,304 B2
(45) Date of Patent: May 2, 2017

(54) SPUR DIFFERENTIAL GEAR

(71) Applicant: Schaeffler Technologies AG & Co. KG, Herzogenaurach (DE)

(72) Inventors: Thorsten Biermann, Wachenroth (DE); Harald Martini, Herzogenaurach (DE); Inaki Fernandez, Nuremberg (DE); Simone Lombardo, Nuremberg (DE); Franz Kurth, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 10 days.

(21) Appl. No.: 14/437,060

(22) PCT Filed: Nov. 11, 2013

(86) PCT No.: PCT/DE2013/200289
§ 371 (c)(1),
(2) Date: Apr. 20, 2015

(87) PCT Pub. No.: WO2014/086353
PCT Pub. Date: Jun. 12, 2014

(65) Prior Publication Data
US 2015/0267798 A1    Sep. 24, 2015

(30) Foreign Application Priority Data

Dec. 4, 2012  (DE) .................. 10 2012 222 227

(51) Int. Cl.
F16H 48/11 (2012.01)
F16H 48/38 (2012.01)
F16H 48/10 (2012.01)

(52) U.S. Cl.
CPC ........ *F16H 48/11* (2013.01); *F16H 2048/106* (2013.01); *F16H 2048/385* (2013.01)

(58) Field of Classification Search
None
See application file for complete search history.

(56) References Cited

U.S. PATENT DOCUMENTS 3,406,593 A   10/1968  Vesey
3,738,192 A   6/1973   Belansky
(Continued)

FOREIGN PATENT DOCUMENTS

DE     19854215      5/2000
DE     102007040478  3/2009
(Continued)

*Primary Examiner* — Justin Holmes
*Assistant Examiner* — Timothy M Hannon
(74) *Attorney, Agent, or Firm* — Simpson & Simpson, PLLC

(57) ABSTRACT

A spur differential gear, including a planet carrier having a rim gear carrier with a plurality of radially inward protruding segments circumferentially displaced from each other creating windows therebetween, and first and second hubs fixedly secured to opposite axial sides of the plurality of segments, wherein the components of the rim gear carrier are non-rotatably connected to each other, first and second output gears, a revolving planet arrangement contradirectionally rotatably coupling the first and second output gears via a plurality of circumferentially displaced planet pairs, each planet pair including first and second revolving planets configured to rotate around their own planet axes, wherein the first and second revolving planets revolve with the planet carrier around the axis of rotation and are rotatable opposite it around the first and second planet axes, respectively, wherein one of the plurality of planet pairs is accommodated in each of the plurality of window segments.

9 Claims, 6 Drawing Sheets

(56) References Cited

U.S. PATENT DOCUMENTS 8,221,278 B2 7/2012 Biermann et al.
2011/0245012 A1 10/2011 Biermann et al.

FOREIGN PATENT DOCUMENTS

DE 102009032286 6/2010
WO WO 2010112366 A1 * 10/2010 ........... F16H 48/285

* cited by examiner

SPUR DIFFERENTIAL GEAR

CROSS-REFERENCE TO RELATED APPLICATIONS

The present application is the U.S. national stage application pursuant to 35 U.S.C. §371 of International Application No. PCT/DE2013/200289, filed on Nov. 11, 2013, which application claims priority from German Patent Application No. DE 10 2012 222 227.8, filed on Dec. 4, 2012, which applications are incorporated herein by reference in their entireties.

TECHNICAL FIELD

The invention concerns a differential gear with a planet carrier and a first and a second output gear, configured in each case as a spur gear, whereby this differential gear splits the drive power applied to the planet carrier and transmits it to the first and the second output gear.

BACKGROUND OF THE INVENTION

Differential gears are generally designed as planetary gearings and predominantly serve to split or distribute a power input onto two drive shafts. Differential gears are most often used as axle differentials in automotive construction. The drive power provided by a drive motor is distributed to the wheel drive shafts of powered wheels via the differential gear. The two wheel drive shafts leading to the wheels are hereby driven with equal torque, i.e. evenly. When driving straight forward, both wheels turn at the same speed. When driving a curve, the rotational speeds of the wheels are different. The axle differential gear allows the rotational speeds to be different. The rotational speeds can adjust freely, only the mean value of the two speeds remains unchanged. In the past, these differentials were widely configured as bevel-gear differentials. Besides this design, differential gears are also configured in the form of spur gear differentials. For these spur gear differentials, the linkage of the output gears functioning as the power output occurs via at least two revolving planets, engaged with one another and thus contradirectionally rotatably coupled, which are typically configured as spur gears.

A spur gear differential that comprises a planet carrier consisting of a spur gear rim and a pair of hub covers axially attached to one side to the spur gear rim is known from U.S. Pat. No. 8,221,278 B2. The hub covers are configured as sheet-formed parts and are axially shaped in such a way that, in the assembled condition, they form a space in which a first and a second output gear, configured in each case as a spur gear, is accommodated. The two output gears are contradirectionally rotatably coupled via revolving planets. The revolving planets form a first revolving planet group and a second revolving planet group. The revolving planets of the first revolving planet group are engaged with the first output gear, the revolving planets of the second revolving planet group are engaged with the second output gear. The coupling of the gears of the revolving planets occurs through their connection under mutual axial displacement of the spur gear arrangement. The sections of the spur gearings, which face away from one another and remain free, engage with the corresponding output gear. The revolving planets are furthermore mounted via bearing bolts. The end sections of the bearing bolts are positioned in locating bores that are configured as such in the hub covers. The spur gear rim, provided to drive the spur gear differential, and the hub covers attached to it form a rigid planet carrier structure. The output gears are axially and radially supported in this planet carrier structure by roller bearings. These roller bearings are configured as cylindrical roller bearings.

A spur gear differential is likewise known from German Patent Application Publication No. DE 10 2007 040 475 A1, in which two inherently identical output gears, configured as spur gears, are contradirectionally rotatably coupled via revolving planet pairs. The engagement zone of these planet pairs is in an area that is axially located between the spur gearings of the output gears.

A spur gear differential is known from U.S. Pat. No. 3,738,192 that exhibits two output gears configured as spur gears, which are contradirectionally rotatably coupled to one another via a revolving planet arrangement. The revolving planet arrangement forms a rim gear. The cogs between the revolving planets forming the rim gear engage, in the same manner as stated with regard to German Patent Application Publication No. DE 10 2007 040 475 A1, in a gearing level between those gearing levels over which the revolving planets engage with the output gears.

SUMMARY

According to aspects illustrated herein, there is provided a spur differential gear, including a planet carrier configured to rotate around an axis of rotation and having a rim gear carrier having a plurality of radially inward protruding crosspiece segments, each crosspiece segment having a first radial surface facing a first axial direction and a second radial surface facing a second axial direction opposite the first axial direction, the plurality of segments circumferentially displaced from each other whereby a plurality of window segments are formed therebetween, a first hub cover element fixedly secured to the first radial surfaces of the plurality of crosspiece segments, and, a second hub cover element fixedly secured to the second radial surfaces of the plurality of crosspiece segments, wherein the rim gear carrier, the first hub and the second hub are non-rotatably connected to each other, a first output gear arranged on the axis of rotation and forming a first output gear system, a second output gear arranged on the axis of rotation and forming a second output gear system, and, a revolving planet arrangement contradirectionally rotatably coupling the first and second output gears via a plurality of circumferentially displaced planet pairs, each planet pair including a first revolving planet configured to rotate around a first planet axis, and a second revolving planet configured to rotate around a second planet axis, wherein the first and second revolving planets revolve with the planet carrier around the axis of rotation and are rotatable opposite it around the first and second planet axes, respectively, wherein one of the plurality of planet pairs is accommodated in each of the plurality of window segments.

Advantageously, this allows the creation of a differential gear with a small axial package in which the outer diameter of the output gears can be designed to be relatively large compared to the outer diameter of the planet carrier. Further, the revolving planet pairs, provided to link the output gears, are accommodated in the window segments to save space and maintain a high degree of kinematic rigidity, whereby the crosspiece segments are positioned axially between the hub cover elements.

In an example embodiment, the spur gear differential is configured in such a way that the axial thickness of the crosspieces, measured in the direction of the axis of rotation, is smaller than the width of the rim gear carrier measured in the direction of the axis of rotation. This makes it possible to axially countersink the hub cover elements into the rim gear carrier and thus radially position them in an advantageous manner.

In an example embodiment used in a vehicle with a transversely mounted engine, in particular in a front-wheel drive vehicle, the rim gear carrier preferentially forms a spur gear rim, in particular a helical spur gear rim. The connection of the spur gear differential to a vehicle's transmission, in particular a manual transmission, then occurs via this spur gear rim.

In an example embodiment used as a rear axle differential, it is advantageously possible to configure the rim gear carrier in such a way that an angular gear can be realized via its gearing as well. To do this a bevel gear, or a gearing complementary to a worm gear, e.g. a hypoid gear, can be configured on the rim gear carrier.

In an example embodiment, the spur gear differential is configured in such a way that the first revolving planets are engaged with the first output gear in a first gearing level, and the second revolving planets are engaged with the second output gear in a second gearing level, whereby the engagement of the revolving planets within a revolving planet pair likewise occurs in the first gearing level. This enables the output gears to be arranged in direct proximity to one another.

The mutual engagement of the revolving planets in the first gearing level is made possible by providing a negative profile displacement on the first output gear and a positive profile displacement on the second output gear. In addition, a positive profile displacement is advantageously made on the first revolving planets, and each respective first revolving planet is designed in such a way that its width measured in axial direction essentially corresponds to the width of the gearing of the first output gear measured in axial direction.

In an example embodiment, a negative profile displacement is made on the second revolving planets. The width of the gearing of the second revolving planets measured in axial direction essentially corresponds to the sum of the width dimensions of the gearings of the first and second output gear.

In an example embodiment, a pair of axial bores, sequential in peripheral direction of the rim gear carrier (or, bores circumferentially displaced from one another), is configured in each crosspiece segment. The hub cover elements can then be mounted to the crosspieces via connectors, and the connectors are then guided through these axial bores. The connectors can be designed in particular to be rivets, or screws.

In an example embodiment, the rim gear carrier forms a first and a second inner peripheral ring surface, concentric to the axis of rotation (or, centered on the axis of rotation), and the respective hub cover element being positioned, radially centered, in the corresponding inner peripheral ring surface.

The hub cover elements can be manufactured as sheet-formed parts and also function as gear covers through which the inner mechanics of the spur gear differential are housed in interaction with the rim gear carrier. This allows an axial positioning of the output gears via the hub cover elements. This positioning is achieved in that the first output gear is radially and axially supported by a ring-type first insert element mounted on the first hub cover element, and the second output gear is radially and axially supported by a ring-type second insert element mounted on the second hub cover element.

In an example embodiment, the mounting of the planet carrier occurs via a planet carrier bearing assembly configured as a roller bearing. This planet carrier bearing assembly exhibits a first and a second roller bearing, each one comprising a bearing inner ring and bearing outer ring, and an insert element, coaxial to the axis of rotation, is attached to at least one of the bearing rings, forming a guide structure through which at least one of the output gears is radially and/or axially supported on the bearing ring. This makes it possible to create a differential gear in which the roller bearing, provided to mount the planet carrier, carries a positioning element that, as such, precisely radially and axially supports the output gears with a high degree of rigidity. Advantageously, with a small requirement for axial installation space, the overall rigidity of the differential system is hereby increased, and a counter-measure to excessive axial traveling and tilting of the output gears is provided.

In an example embodiment, the differential gear is configured in such a way that the insert elements revolving with the planet carrier are used for axial as well as radial support of the output gears. The connection of the bearing assembly to the planet carrier is hereby preferably accomplished in such a way that the bearing outer rings represent the bearing rings carrying the planet carrier. The coupling of the bearing outer rings to the planet carrier can be accomplished by, in each case, including the bearing outer rings in a collar revolving with the planet carrier. Each respective collar can be formed by the previously mentioned hub cover elements, which are radially and axially secured on the planet carrier and carry it. The particular hub cover element is preferably manufactured as a sheet-formed part. The aforementioned respective bearing outer ring can then sit in the collar under a light press fit. In order to secure the axial position of each bearing outer ring in the collar, it is advantageously possible to configure an annular shoulder on each bearing outer ring that, as such, secures the axial slot position of the respective bearing outer ring when being pressed into the corresponding collar of the hub cover element.

The two roller bearings are configured in a favorable manner as angular contact ball bearings, whereby the inclusion of the roller bearings in the differential gear preferably occurs in a so-called O-arrangement.

In an example embodiment, the differential gear is configured in such a way that, for the purpose of connecting a wheel drive shaft, each output gear exhibits a bushing-type connecting section that protrudes axially outward over its gearing level, and the planet carrier bearing assembly is additionally configured in such a way that a suitable amount of annular space to accommodate a stationary part radially carrying the bearing inner ring remains between its respective bearing inner ring and the connecting section. Each stationary part can, for example, be designed as a collar that is an integral part of a differential gear housing and axially extends into that annular space from the side.

The concept according to the invention allows a reduction of the need for radial installation space dictated by the radial dimensions of the sun, the revolving planet gears and by the flange, as well as by the gearing of the drive gear. For this reason, the spur differential can be built to be relatively compact. The invention makes provisions for the flange of the drive gear to be divided into flange sections engaging between the planet gears radially inward into the pitch circle of the planet gears, so that the dimensions of the flange do not affect the radial dimensions of the spur differential (SRD).

BRIEF DESCRIPTION OF THE DRAWINGS

The nature and mode of operation of the present invention will now be more fully described in the following detailed description of the invention taken with the accompanying figures, in which:

FIG. 1b is a top view of the differential gear according to the invention in shown in FIG. 1a;

FIG. 1c is a perspective view of the rim gear carrier provided in the differential gear shown in FIG. 1a;

DETAILED DESCRIPTION

Figure 1A:
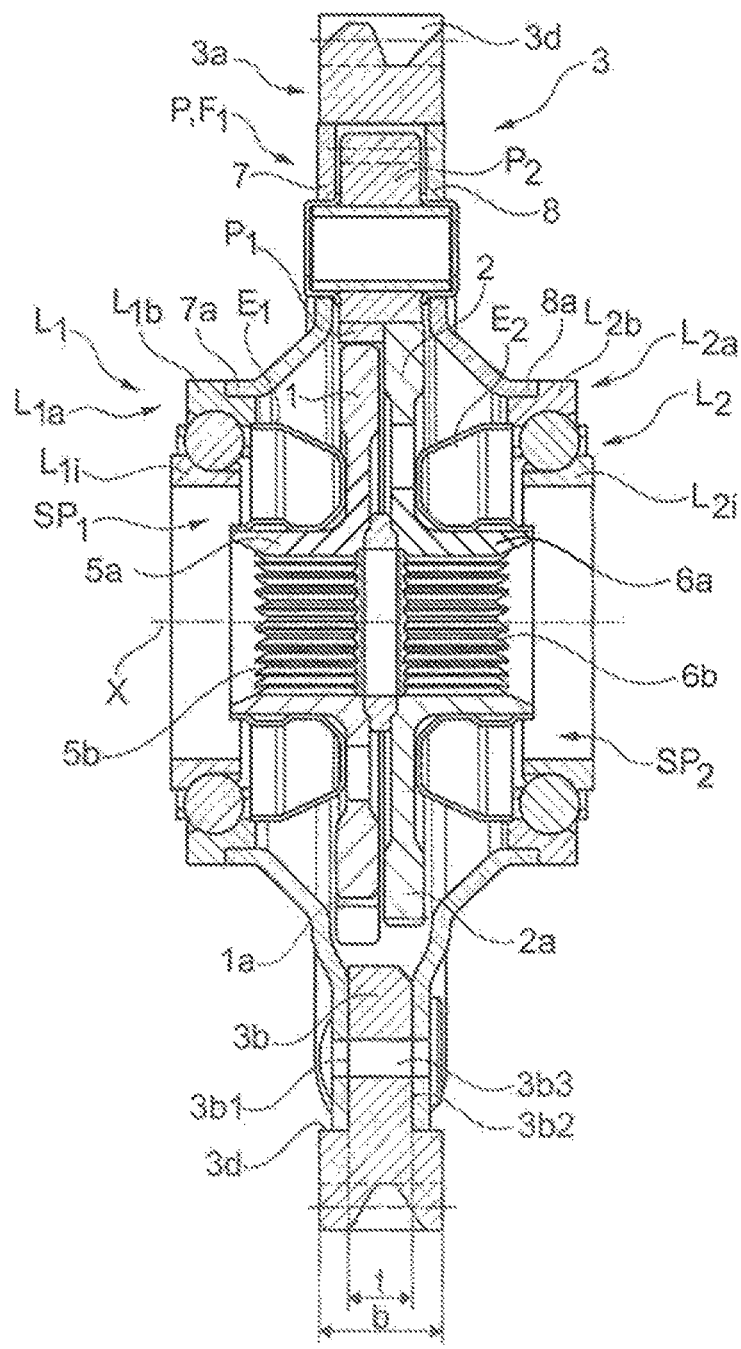
FIG. 1a is a cross-sectional view of a differential gear according to the invention.

At the outset, it should be appreciated that like reference characters on different drawing views identify identical, or functionally similar, structural elements of the invention. While the present invention is described with respect to what is presently considered to be the preferred aspects, it is to be understood that the invention as claimed is not limited to the disclosed aspect. The present invention is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

By "non-rotatably connected" first and second components we mean that the first component is connected to the second component so that any time the first component rotates, the second component rotates with the first component, and any time the second component rotates, the first component rotates with the second component. Axial displacement between the first and second components is possible.

FIG. 1a is a cross-sectional view of a differential gear according to the invention. The differential gear is configured as a spur differential gear and comprises planet carrier 3 and a planet carrier bearing assembly is configured as a roller bearing to mount planet carrier 3 to rotate around axis of rotation X.

The differential gear further includes first output gear 1 that is radially centered on the same axis as the axis of rotation X and forms first output gear system 1a. In addition, the differential gear further comprises second output gear 2 that is likewise arranged to be radially centered on the same axis as the axis of rotation X and forms second output gear system 2a.

Output gears 1, 2 are contradirectionally rotatably coupled via planet gear arrangement P, not entirely visible in FIG. 1a. Planet gear arrangement P includes revolving planets P1, P2 that revolve with planet carrier 3 around axis of rotation X and are rotatable opposite it.

Planet carrier 3 includes rim gear carrier 3a and first and second hub cover elements 7, 8. Rim gear carrier 3a and hub cover elements 7, 8 form a housing structure in which the power-split mechanism, formed under inclusion of planet gear arrangement P and provided to split the power, is accommodated. Output gears 1, 2 are contradirectionally rotatably coupled via planet gear arrangement P.

Figure 1B:
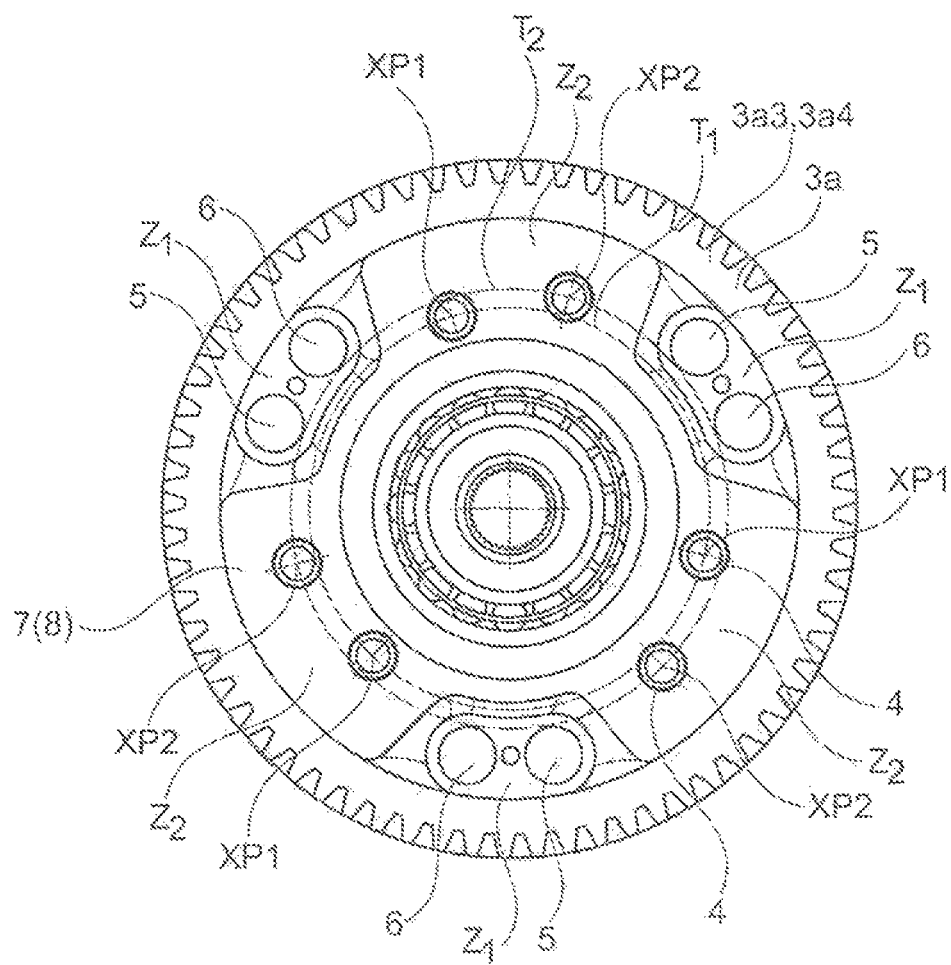
Figure 1C:
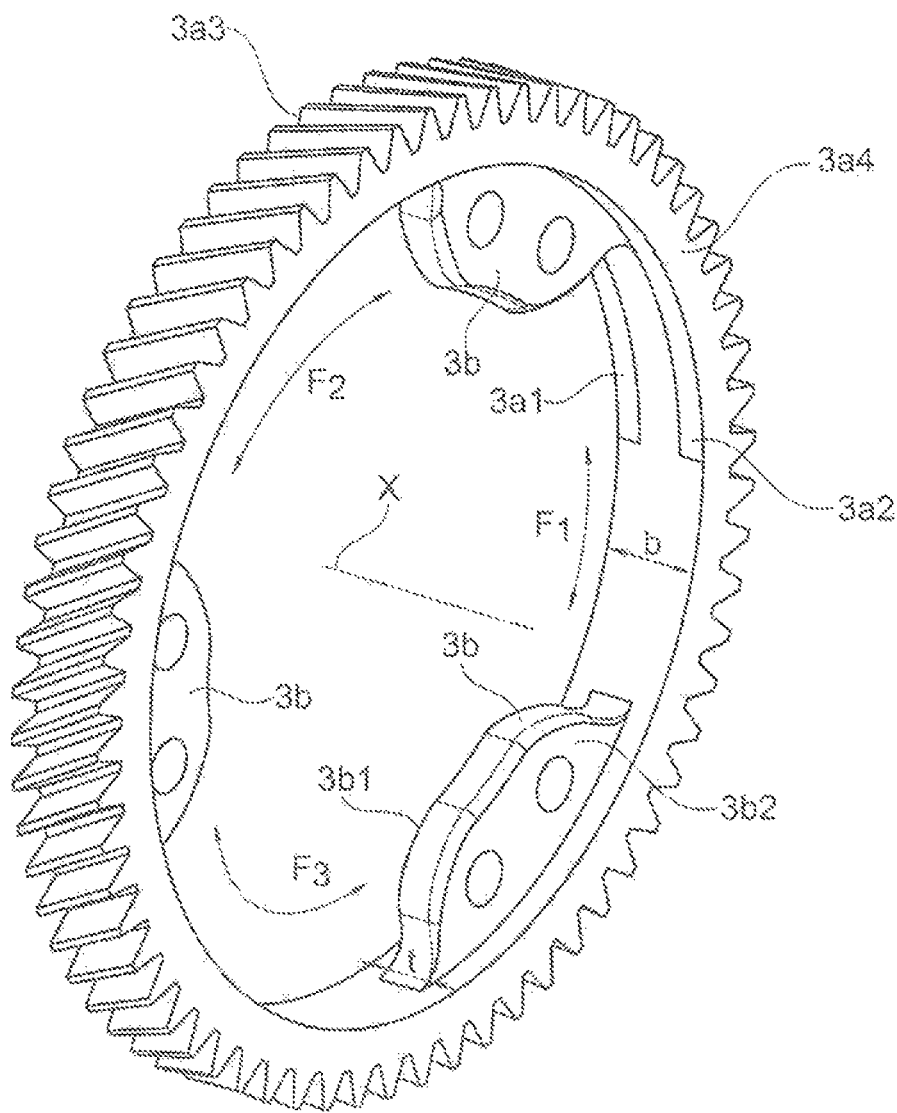

The spur differential according to the invention shown in FIG. 1a distinguishes itself in that rim gear carrier 3a exhibits several, in peripheral direction sequential (or, in other words, are circumferentially displaced from each other), radially inward protruding crosspiece segments 3b, while leaving window segments F1, F2, F3 between them (shown in FIG. 1c). Each crosspiece segment 3b forms first and second segment front surfaces 3b1, 3b2 that face in opposite axial directions from each other. By "axial direction", it is meant in a direction parallel to axis of rotation X. Furthermore, first hub cover element 7 and second hub cover element 8 are secured to the first and second segment front surfaces 3b1, 3b2 respectively, such that cross piece segments 3b are situated axially between hub cover elements 7 and 8. In addition, one planet pair P1/P2 is accommodated in each respective window segment F1.

Axial thickness t of crosspiece segments 3b, measured in the direction of axis of rotation X, is smaller than width b of rim gear carrier 3a measured in the direction of axis of rotation X. In the example embodiment shown here, rim gear carrier 3a is configured as a spur gear rim.

First revolving planets P1 are engaged with first output gear 1 in a first gearing level. Second revolving planets P2 are engaged with second output gear 2 in a second gearing level. In addition, the mutual engagement of revolving planets P1, P2 of revolving planet pair P likewise occurs in the first gearing level; in other words axially at the height of the gearing of first output gear 1.

A negative profile displacement is made on first output gear 1 and a positive profile displacement is made on second output gear 2. Furthermore, a positive profile displacement is made on first revolving planets P1, and the width of these first revolving planets P1 measured in the axial direction essentially corresponds to the width of the gearing of first output gear 1 measured in the axial direction. A negative profile displacement is made on second revolving planets P2, and the width of the gearing of second revolving planets P2, measured in the axial direction, essentially corresponds to the sum of the width dimensions of the gearings of first and second output gears 1, 2.

A pair of axial bores 3b3, 3b4, sequential in peripheral direction of the rim gear carrier (or, circumferentially displaced from each other), is configured in each crosspiece segment 3b, and hub cover elements 7, 8 are mounted to crosspieces 3b via connectors 5, 6 (shown in FIG. 1b) that are guided through axial bores 3b3, 3b4.

On two peripheral areas, opposite another with regard to crosspiece segments 3b, rim gear carrier 3a forms first and second inner peripheral ring surfaces 3d, 3e, centered on axis of rotation X, through which the respective hub cover element 7, 8 is positioned, radially centered, in the corresponding inner peripheral ring surface 3d, 3e.

The differential gear according to the invention shown here additionally distinguishes itself in that the planet carrier bearing assembly exhibits first and second roller bearings L1, L2, each comprising bearing inner rings L1i, L2i and bearing outer rings L1a, L2a, and insert elements E1, E2 are attached to at least one of bearing rings L1a, L2a, forming a guide structure through which at least one of output gears 1, 2 is radially and/or axially supported. Insert elements E1, E2 are centered on axis of rotation X by the bearing assembly. Insert elements E1, E2 are configured as an annular plate and exhibits a channel-like cross section in the axial plane, the channel base area of which faces the adjacent output gear 1, 2, and the opening area of which faces the corresponding bearing L1,L2.

In this configuration, the differential gear shown here distinguishes itself with a relatively short axial structural length and, from a mounting-technical perspective, it can be assembled particularly advantageously as well. As becomes evident for the differential gear according to the invention, insert elements E1, E2, provided to axially and radially mount the output gears 1, 2, is centered by the respective bearing ring L1a, L2a revolving with planet carrier 3 and is hereby connected with the planet carrier 3. Insert elements E1, E2 can also be equipped with geometric structures that engage with the planet carrier, in particular with hub cover elements 7, 8.

In the bearing assembly according to the invention shown here, bearing outer rings L1a, L2a represent the bearing rings that carry planet carrier 3. The ring surfaces made available by these bearing outer rings L1a, L2a form seats via which the respective insert element E1, E2 is precisely centered, and also precisely axially positioned within planet carrier 3.

In each case, bearing outer rings L1a, L2a are accommodated in collar 7a, 8a formed by the respective hub cover element 7, 8 Annular shoulder L1b, L2b is configured on each bearing outer ring L1a, L2a that, as such, secures the axial slot position of the respective bearing outer ring L1a, L2a in the corresponding collar 7a, 8a.

The respective collar 7a, 8a is formed by the corresponding hub cover element 7, 8, that forms a component of planet carrier 3. The respective hub cover element 7, 8 is manufactured as a sheet-formed part, and the corresponding bearing outer ring L1a, L2a is positioned radially free of play in collar 7a, 8a under a strong press fit.

As stated, the differential gear is designed as a spur differential, and is hereby configured in such a way that bearing outer rings L1a, L2a act as a centering structure, via which the respective insert element E1, E2 is positioned in the interior of planet carrier 3. In each case, output gears 1, 2 are configured as spur gears, whereby each of these spur gears is axially and radially supported by the respective insert element E1, E2.

The differential gear according to the invention is configured in such a way that the respective output gear 1, 2 exhibits connecting section 5a, 6a, protruding axially outward over the gearing level, to connect a wheel drive shaft, and planet carrier bearing assembly 3 is configured in such a way that annular spaces SP1, SP2, suitable to accommodate a stationary part radially carrying bearing inner ring L1i, L2i, remains between its respective bearing inner ring L1i, L2i and connecting section 5a, 6a. The aforementioned stationary part can be formed, by a gear housing or by a banjo fitting element that, in sections, is axially inserted, in other words from the side, into the corresponding bearing inner ring L1a, L2i. An additional bearing assembly can then be accommodated in this banjo fitting element, which holds a shaft section, or an articulated shaft pot, inserted into the respective output gear. As stated, output gears 1, 2 are configured as spur gears. Gearings 1a, 2a, that are provided on these, are engaged with revolving planet P1, or P2. The respective connecting section 5a, 6a forms a peripheral surface, concentric to axis of rotation X, that axially extends into the inner collar section of the respective insert element E1, E2 from the inside and, if necessary, is radially guided in the collar section by the insertion of a bearing ring.

The aforementioned first and second revolving planets P1, P2 are directly engaged with one another and are, as will be explained in more depth in the following, coupled to one another via gears in such a way that they rotate contradirectionally. In an example embodiment, a total of three revolving planets P1 are provided that are engaged with the first output gear. These revolving planets P1 that are engaged with first output gear 1 form a first revolving planet set. In addition, a total of three revolving planets P2 are provided that are engaged with second output gear 2. These revolving planets P2 that are engaged with second output gear 2 form a second revolving planet set. One revolving planet P1 of the first set at a time is engaged with one revolving planet P2 of the second set. The engagement of revolving planets P1 of the first set with revolving planets P2 of the second set occurs in the same gearing level as the engagement of revolving planets P1 of the first set with first output gear 1. In addition, the mutual engagement of revolving planets P1, P2 of a pair occurs in the radial level of the window segments F1, F2, F3.

In terms of the gearing geometry, first output gear 1 and second output gear 2 are aligned in such a way that the tip circle of spur gear arrangement 1a of first output gear 1 is smaller than the root circle of output gear arrangement 2a of second output gear 2. Revolving planets P1 of the first set engage into revolving planets P2 of the second set in the area of the gearing level of first output gear 1. The two output gears 1, 2 are thus directly adjacent.

The two output gears 1, 2 are configured in such a way that output gear arrangement 1a of first output gear 1 and output gear arrangement 2a of second output gear 2 exhibit the same number of cogs. Revolving planets P1 of the first set and revolving planets P2 of the second set exhibit the same number of cogs as well.

Planet carrier 3 has rim gear carrier 3a. As designed, rim gear carrier 3a forms inner crosspieces 3b. Hub cover elements 7, 8 are attached to inner crosspieces 3b. The components accommodated in planet carrier 3 are secured and united to one structural unit by hub cover elements 7, 8. Hub cover elements 7, 8 are designed as sheet-formed parts and secured centered on spur gear rim 3a. As already stated, hub cover elements 7, 8 form collar sections 7a, 8a that act as bearing seats, into which bearing outer rings L1a, L2a are pressed. Crosspieces 3b form several window segments that are sequential in peripheral direction. One revolving planet pair, having first revolving planet P1 and second revolving planet P2, at a time, is positioned in these gaps.

The introduction of the drive power into the differential gear occurs via spur gear arrangement 3d of rim gear carrier 3a. The power is split and transmitted to output gears 1, 2 via revolving planets P1, P2. Collar sections 5a, 6a are configured on output gears 1, 2. Collar sections 5a, 6a are manufactured by extrusion and provided with inner gearing 5b, 6b. Corresponding complementary toothed end sections of wheel drive shafts, or other power transfer components of the respective wheel drive train, can be inserted into inner gearing 5b, 6b. Instead of the inner gearing shown here, other connecting geometries to transmit torque and for the centered accommodation of corresponding components can be used as well.

The configuration of the differential gear according to the invention is further illustrated in FIG. 1b in the form of a top view. Axes XP1 of revolving planets P1 are on first axis circle T1. Axes XP2 of revolving planets P2 are on second axis circle T2. Axis circle T1 has a diameter that is smaller than the diameter of axis circle T2. In an example embodiment, the difference in the diameters of axis circles T1, T2 roughly corresponds to twice the cog height of the cogs of first output gear arrangement 1a. Crosspiece segments 3b shown in FIG. 1a extend radially to at least second axis circle T2, preferably also to first axis circle T1. The difference between the diameters of the tip circles of first and second output gear arrangements 1a, 2a is realized through profile displacements. Axes XP1, XP2 of revolving planets P1, P2 are fixed by bearing bolts 4 (configured here as hollow bushings) seated in hub covers 7, 8. Hub covers 7, 8 are attached to spur gear rim 3a. This attachment is accomplished by rivets 5, 6. Rivets 5, 6 secure hub cover elements 7, 8 to inner crosspieces 3b protruding radially inward from spur gear rim 3a. One planet pair, formed by revolving planets P1, P2, at a time is positioned in a gap remaining between inner crosspieces 3b.

As illustrated, hub cover elements 7, 8 can be configured identically. In addition, hub cover elements 7, 8 can be given a specific axial profile that, for example, has contact zones Z1 that protrude slightly axially to crosspiece segments 3b, as well as pocket zones Z2 that are again elevated above this. The transition area between zones Z1, Z2 can be contoured in such a way that the inner surfaces of the crosspiece segments engage with this contouring, so that hub covers 7, 8 are locked against turning on crosspiece segments 3b (or, hub covers 7 and 8 are non-rotatably secured to crosspiece segments 3b), thus reducing the sheer force load on connectors 5, 6. In an example embodiment, the outward-facing cover surfaces of hub cover elements 7, 8 are essentially flush with annular front surfaces 3a3, 3a4 of rim gear carrier 3a.

In FIG. 1c, rim gear carrier 3a is shown as a single component in a perspective view. As can be seen, rim gear carrier 3a forms several radially inward protruding crosspiece segments 3b circumferentially displaced from each other and creating window segments F1, F2, F3. Each crosspiece segment 3b forms first and second segment front surfaces 3b1, 3b2 that face axially away from one another. On front surfaces 3b1, 3b2, hub cover elements 7, 8are axially attached to first and second segment front surfaces 3b1 and 3b2, respectively. The installation space circumferentially between window segments F1, F2, is used to accommodate revolving planets P1, P2, in each case of one planet pair.

Axial thickness t of crosspieces 3b, measured in the direction of axis of rotation X, is smaller than width b of rim gear carrier 3a measured in the direction of axis of rotation X. Rim gear carrier 3a forms inner peripheral annular surface sections 3a1, 3a2 that act as centering surfaces to centrally arrange hub cover elements 7, 8 in relation to axis of rotation X. Here, axial thickness t of crosspiece segments 3b is further adjusted so that hub cover elements 7, 8 come to rest axially below the respective axial level of front surfaces 3a3, 3a4 of rim gear carrier 3a, i.e., countersunk in rim gear carrier 3a. Hub cover elements 7 and 8 cover crosspiece segments 3b on both axial sides.

Figure 2:
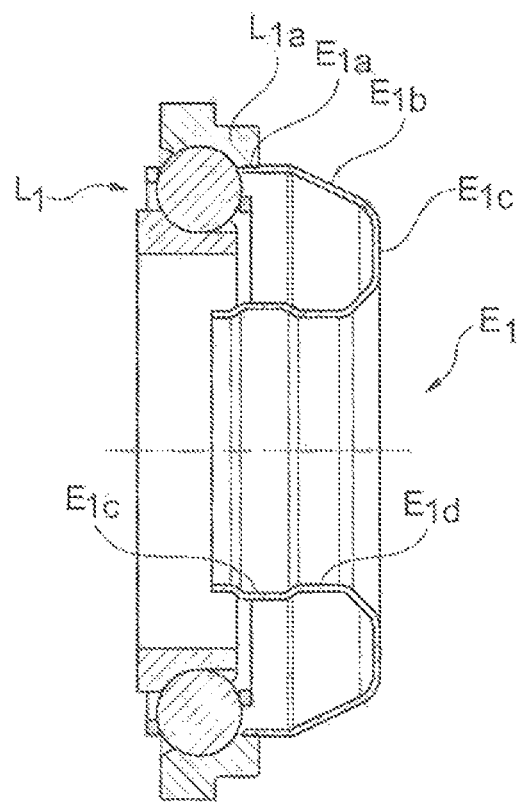
FIG. 2 is a fragmentary view of a differential gear according to the invention detailing an insert element axially supporting an output gear.

The construction and the mounting of insert element E1 to bearing outer ring L1a of bearing assembly L1 is further illustrated in a detailed depiction in FIG. 2. Insert element E1 forms a guide structure via which an adjacent output gear, i.e., gear 1 shown in FIG. 1a, is supported radially and, in addition, axially as well.

In this example, insert element E1 is manufactured from a sheet metal by drawing. Insert element E1 has seat section E1a over which insert element E1 can be attached centered to bearing outer ring L1a. Outer ring jacket section E1b connects to seat section E1a, and ring base section E1c connects to ring jacket section E1b. In the area encompassed by ring jacket section E1b, there is collar section E1d that, as such, is connected with ring jacket section E1b via ring floor section E1c. Collar section E1d is concentric to axis of rotation. In terms of its cross section in the plane of the axial section present here, collar section E1d is configured in such a way that it forms at least one peripheral channel E1e, that functions as an oil channel, or into which, if necessary, a slide bearing ring can be placed.

Through selection of the wall thickness of the sheet metal used to make it, adjustment of the materials technology parameters, and with appropriate geometric configuration, insert element E1 can be manufactured in such a way that a certain amount of elasticity is provided in terms of the coupling of collar section E1d to bearing outer ring L1a, with which the degree of static redundant dimensioning of the mounting of output gear 1 is reduced in a defined manner.

Even though it is not shown here in more detail, it is possible to configure a limit stop structure in the area of seat section E1a, to restrict the axial insertion depth of insert element E1 in bearing ring L1a carrying it. In addition, locking or securing geometries can be implemented here, through which the insert element can be secured to bearing ring L1a. It is also possible to configure a seat section on insert element E1, to accommodate bearing outer ring L1a, and to insert the structure created in this manner into hub cover element 7. In doing so, it is possible to configure the arrangement in such a way that bearing outer ring L1a is axially attached to hub cover element 7 from the inside, thus being axially secured, e.g. via annular ledges (on hub cover element 7, or on bearing outer ring L1a, or on insert element E1).

Figure 3:
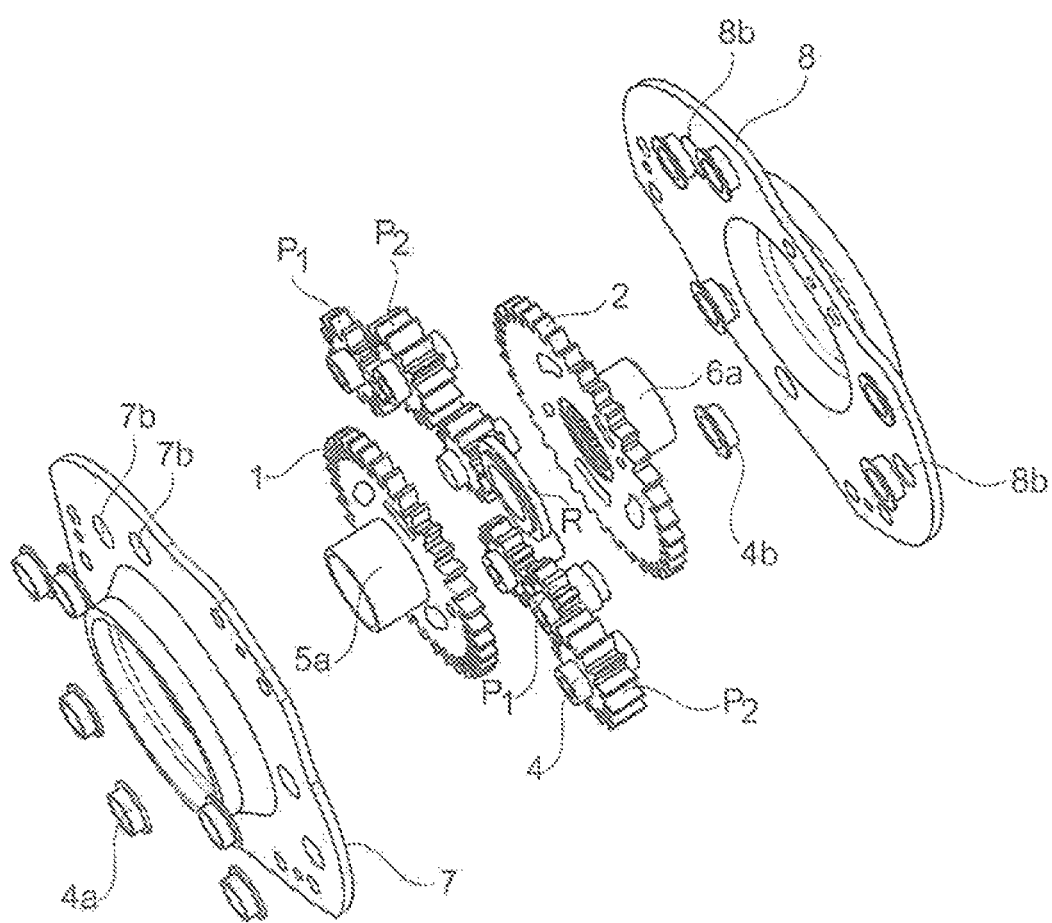
FIG. 3 is a fragmentary exploded view of a differential gear according to the invention to illustrate the structure of the output gears and the associated revolving planets; and, FIG. 4 is a magnified view showing a portion of the differential gear according to the invention.

FIG. 3 is a fragmentary exploded view showing output gears 1, 2, revolving planets P1, provided for the coupling of the former, revolving planets P1, P2, axle bolts 4 provided to mount the revolving planets P1, P1 and hub cover elements 7, 8.

The axial securing of axle bolts 4 occurs via annular cap elements 4a, 4b that are placed on axle bolts 4 in the area of their end faces. When annular cap elements 4a, 4b are on, they overlap the end faces of axle bolts 4 and then each form one annular shoulder in an axially inwards displaced location. These annular shoulders secure annular cap elements 4a, 4b in corresponding axial bores 7b, 8b in hub covers 7, 8.

In the assembled condition, revolving planets P1 engage first output gear 1 radially from the outside. Revolving planets P2 engage second output gear 2 radially from the outside. The coupling of revolving planets P2, engaged with second output gear 2, with revolving planets P1, engaged with first output gear 1, occurs via mutual engagement in the area of the gearing level of first output gear 1. A negative profile displacement is realized on first output gear 1. A positive profile displacement is realized on second output gear 2.

For the described gear structure, it is possible in principle to effect positive and negative profile displacements on revolving planets P1, P2 as well. This allows the difference between the diameters of the axis circles of revolving planets P1, P2 to be reduced. Specifically, the tip circle diameter of second revolving planets P2 is decreased, and the tip circle diameter of first revolving planets P1 is increased, via positive profile displacement.

Ring element R is inserted between output gears 1, 2. It engages with corresponding complementary geometries of output gears 1, 2 via annular shoulders, and provides a mutual centering of output gears 1, 2.

Figure 4:
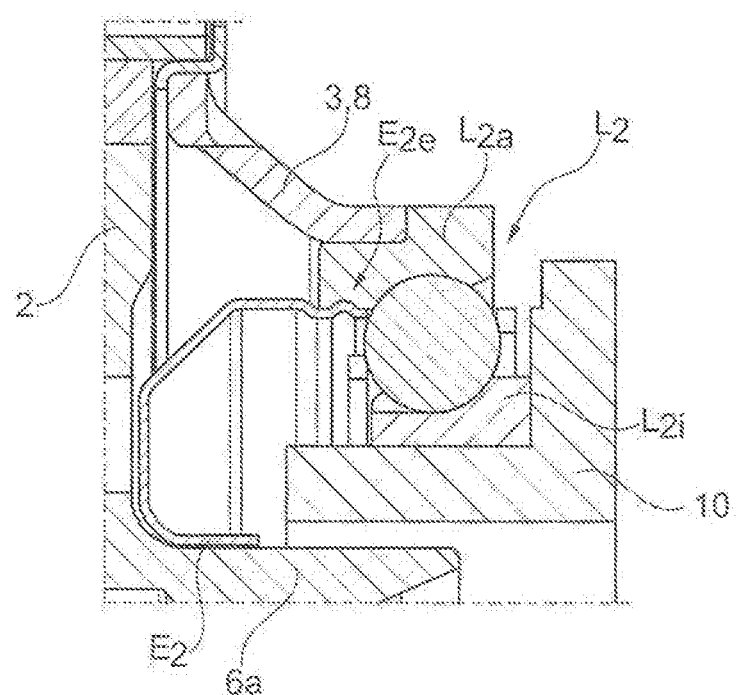

An example embodiment of insert element E2, slightly modified in comparison to the variant shown in FIG. 3, is shown in FIG. 4 in another detail depiction. Insert element E2 functions as a spacer and guide of sun gear 2 here as well. The invention provides one spacer sleeve-plain bearing per sun 1, 2. This spacer sleeve-plain bearing is accomplished for each sun gear by insert element E2. Insert element E2 is configured as a half torus and is supported on bearing ring L2a rotating with planet carrier 3.

In the design example shown here, coupling structure E2e is configured on insert element E2 via which the latter is axially secured on bearing outer ring L2a. The coupling structure comprises a radially bulging torus that engages in a complementary annular groove on the inner peripheral wall of bearing outer ring L2a.

As is further evident from this depiction, bearing inner ring L2i is positioned on stationary ring pin 10 that, as such, extends axially into an annular space remaining between collar 6a and bearing inner ring L2i and, with its outer peripheral surface, forms a seat to carry bearing inner ring L2a.

Thus, it is seen that the objects of the present invention are efficiently obtained, although modifications and changes to the invention should be readily apparent to those having ordinary skill in the art, such modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention as claimed.

What is claimed is:

1. A spur differential gear, comprising:
  a planet carrier configured to rotate around an axis of rotation and having:
    a rim gear carrier having a plurality of radially inward protruding crosspiece segments, each crosspiece segment having a first radial surface facing a first axial direction and a second radial surface facing a second axial direction opposite the first axial direction, the plurality of segments circumferentially displaced from each other whereby a plurality of window segments are formed therebetween;
    a first hub cover element fixedly secured to the first radial surfaces of the plurality of crosspiece segments; and,
    a second hub cover element fixedly secured to the second radial surfaces of the plurality of crosspiece segments;
    wherein the rim gear carrier, the first hub and the second hub are non-rotatably connected to each other;
  a first output gear arranged on the axis of rotation and forming a first output gear system;
  a second output gear arranged on the axis of rotation and forming a second output gear system; and,
  a revolving planet arrangement contradirectionally rotatably coupling the first and second output gears via a plurality of circumferentially displaced planet pairs, each planet pair comprising:
    a first revolving planet configured to rotate around a first planet axis; and,
    a second revolving planet configured to rotate around a second planet axis;
    wherein the first and second revolving planets revolve with the planet carrier around the axis of rotation and are rotatable opposite it around the first and second planet axes, respectively;
  wherein one of the plurality of planet pairs is accommodated in each of the plurality of window segments;
  wherein the rim gear carrier forms a first and a second inner peripheral ring surface, concentric to the axis of rotation, and the respective hub cover element is positioned, radially centered, in the corresponding inner peripheral ring surface, and the crosspiece segments are not connected to each other except by the inner peripheral ring surfaces.

2. The spur differential gear of claim 1, wherein the crosspiece segments have an axial thickness, the rim gear carrier has a width, and the thickness of the crosspiece segments is smaller than the width of the rim gear carrier.

3. The spur differential gear of claim 1, wherein the rim gear carrier forms a spur gear rim.

4. The spur differential gear of claim 1, wherein the first revolving planets are engaged with the first output gear at a radial distance, the second revolving planets are engaged with the second output gear at a second radial distance, and the engagement of the revolving planets of a revolving planet pair occurs at the first radial distance.

5. The spur differential gear of claim 1, wherein the first output gear is displaced in a second circumferential direction and the second output gear is displaced in a first circumferential direction, opposite the second circumferential direction.

6. The spur differential gear of claim 1, wherein the first revolving planets are displaced in a first circumferential direction and the width of the first revolving planets corresponds to the width of the gearing of the first output gear.

7. The spur differential gear of claim 1, wherein the second revolving planets are displaced in a second circumferential direction and the width of the gearing of the second revolving planets measured in the first axial direction essentially corresponds to the sum of the width dimensions of the gearings of the first and second output gears.

8. The spur differential gear of claim 1, wherein the first output gear is radially and axially supported by a first insert element mounted on the first hub cover element, and the second output gear is radially and axially supported by a second insert element mounted on the second hub cover element.

9. The spur differential gear of claim 1, wherein a pair of circumferentially displaced axial bores are configured in each crosspiece segment, and that the hub cover elements are mounted to the crosspieces via connectors that are guided through the axial bores.

* * * * *